United States Patent [19]
Bixby

[11] 4,456,034
[45] Jun. 26, 1984

[54] FORMABLE HOSE

[76] Inventor: Guy T. Bixby, 311 Francis St., Longmont, Colo. 80501

[21] Appl. No.: 221,123

[22] Filed: Dec. 29, 1980

Related U.S. Application Data

[63] Continuation-in-part of Ser. No. 122,783, Feb. 19, 1980, Pat. No. 4,295,496.

[51] Int. Cl.³ .................... F16L 55/00; F16L 11/11
[52] U.S. Cl. .................... 138/122; 138/103; 138/131; 138/139; 138/172; 138/DIG. 8
[58] Field of Search ............. 138/103, 121, 122, 129, 138/131, 139, 172, DIG. 8

[56] References Cited

U.S. PATENT DOCUMENTS

| | | | |
|---|---|---|---|
| 314,440 | 3/1885 | Eames | 138/122 X |
| 1,731,322 | 10/1929 | Riddle | 138/139 X |
| 2,759,765 | 8/1956 | Pawley | 138/DIG. 8 |
| 3,402,741 | 9/1968 | Yurdin | 138/118 |
| 3,889,717 | 6/1975 | Obadal et al. | 138/131 |
| 4,307,754 | 12/1981 | Muratsubaki | 138/121 X |
| 4,327,775 | 5/1982 | Tally | 138/103 |

Primary Examiner—James E. Bryant, III

[57] ABSTRACT

A collapse resistant hose is described which may be selectively deformed to a desired shape. It includes the usual elongated polymeric body, including an internal passageway in which is positioned a spring insert reinforcement. An axially extending rod means is positioned adjacent the spring to which it is intimately attached, permitting the hose to be deformed to a desired shape-retaining configuration by bending the rod beyond its yield point.

27 Claims, 12 Drawing Figures

FORMABLE HOSE

CROSS REFERENCE TO RELATED APPLICATIONS

This application is a continuation-in-part of copending U.S. patent application Ser. No. 122,783, filed Feb. 19, 1980, now U.S. Pat. No. 4,295,496.

This invention is also related generally to the problems addressed by commonly assigned copending U.S. patent application Ser. No. 795,343, filed May 9, 1977, now U.S. Pat. No. 4,327,775, entitled "Formable Hose With A Reformable Insert".

BACKGROUND OF THE INVENTION

This invention relates to hose having spring inserts in the passageway thereof, together with yieldable means positioned in the passageway to permit the hose to be selectively deformed to any desired shape-retaining configuration.

Radiator hose, air brake hose and various other flexible automotive and industrial hoses incorporate corrugated spring inserts of annular or spiral coil form to resist collapse of the hose because of reduced pressures encountered. Hose with such non-embedded spring coil inserts are well known, see for instance U.S. Pat. No. 314,440 to Eames. To avoid obstacles or moving parts in a particular application, it is sometimes necessary to form the hose in a fixed shape, sometimes with multiple bends and complex curvature to provide the needed clearance. This is normally accomplished by molding the hose to the desired fixed shape, however with the drawback that inventories of each curved shape must be kept. Automotive coolant hose and smooth bore heater hose are examples of hose which must be bent or shaped to provide clearance from under-the-hood engine and automotive accessory components.

The use of rod type inserts which may be bent beyond their yield point to give the hose a desired shape, or for kink resistance, are known, as shown for instance in U.S. Pat. Nos. 1,731,322 to Riddle, U.S. Pat. No. 3,402,741 to Yurdin, U.S. Pat. No. 3,610,289 to Moss, as well as the above-identified U.S. Ser. No. 795,343.

While the prior art formable hoses may have performed satisfactorily for their intended purposes, they lack applicability to flexible hose of the type having an interiorly positioned collapse resistant spring means.

It is an object of the subject invention to provide a formable hose in which a shaping member such as yieldable rod means, which permits selective deformation of the hose to a desired shape, is integrally attached to the spring insert to permit a coordinated bending and rebending of the hose as a structural unit. It is another object of one aspect of the invention to provide a combination spring insert and rod means which allows easy insertion within the passageway of the hose, attaining proper registration of the turns of the spring insert within corresponding troughs of the corrugated inner wall of the hose, and precluding displacement of the turns from the associated troughs. It is another object to provide means for accurately maintaining spacing between turns of the coil, and to prevent their crossing over one another. These and other objects will become apparent upon a reading of the following description.

SUMMARY OF THE INVENTION

Briefly described, the hose of the invention is adapted to be selectively deformed, and redeformed, to a desired configuration, and comprises an elongated flexible polymeric hose body having an internal passageway; spring insert reinforcement means positioned within the passageway thereof; shaping member means positioned adjacent the spring means and selectively deformable to a desired shape-retaining configuration; and means attaching the shaping member means to the spring means in mutually supportive relation.

In another aspect, the invention is drawn to a collapse resistant formable hose kit comprising a polymeric flexible hose body having an internal passageway, and a composite coiled insert member adapted to be inserted in the passageway of the hose and retained in place, the composite insert member comprising a spring reinforcement having a plurality of coils spaced apart; rod means positioned adjacent the spring reinforcement and selectively deformable to a desired shape-retaining configuration; and means attaching the rod means to the spring reinforcement in mutually supportive relation.

BRIEF DESCRIPTION OF THE DRAWINGS

The invention in its preferred embodiments will be described more fully with reference to the accompanying drawings, in which like numerals designate like parts, and in which.

PREFERRED EMBODIMENTS OF THE INVENTION

Figure 2:
FIGS. 2 and 3 depict in section, as viewed along section A—A of FIG. 1, alternative attaching means.
Figure 3:
Figure 4:
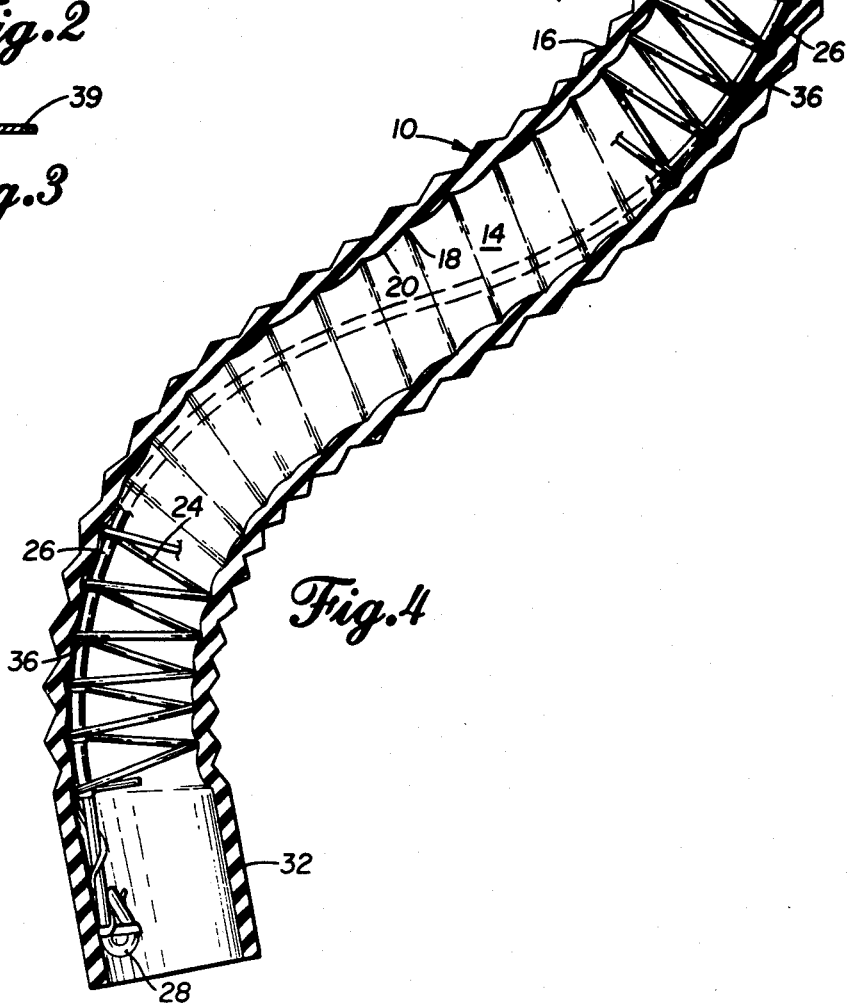
FIG. 4 is a partial cutaway axial sectional view of a formable hose of the invention which has been deformed from a straight configuration to a desired curvature.

Referring first to FIGS. 1-4, there is shown a hose generally at 10, and a composite insert 12 adapted to be inserted within the internal passageway 14 of the hose. The final assembly, after deformation to a desired shape, is shown in FIG. 4.

The hose is formed of a polymeric flexible body 16 having a corrugated inner wall defined by alternate troughs 18 and crests 20. The corrugations along the inner wall may be in spiral convoluted form, as in FIGS. 4 and 5, or corrugated in annular form as shown in FIG. 7. The wall of the hose may be formed of thermoplastic material but is more preferably elastomeric, such as natural or synthetic rubber, e.g., neoprene, EPDM, or the like. The hose wall may contain an embedded reinforcement 19, such as a textile fabric, braid or knit (shown in FIGS. 5-7), and the hose may terminate in the usual cuff ends 32, 34 of the same or different size.

Figure 5:
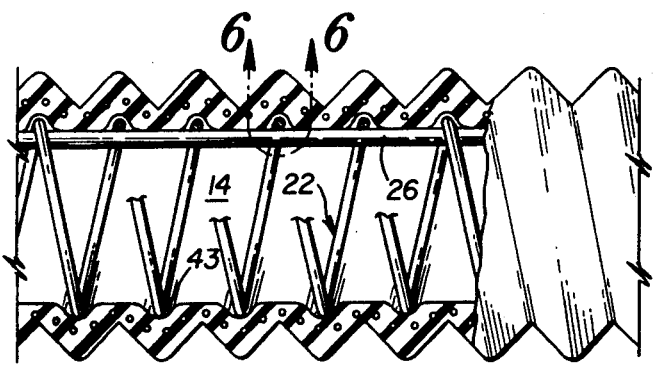
FIG. 5 illustrates in partial axial section an alternative hose configuration of the invention.

The outer wall of the hose may be shaped as desired, for instance, smooth, spirally corrugated as shown in FIGS. 4 and 5, or annularly corrugated as shown in FIG. 7. The hose 10 in general may be built in known manner, such as by plying up tube, any reinforcement, and cover on a mandrel. More simply, the tube may be extruded and then a knit, braid, spiral, wrap or other reinforcement twined over the tube, and then a cover extruded thereover. To form the corrugated inner (and outer) wall, it is preferred to blow mold the uncured preform against a correspondingly shaped exterior mold.

The composite insert of the invention of FIGS. 1-4 and 10 includes a helically convoluted spring 22 having a plurality of turns 24 formed of a collapse resistant wire or other material of sufficient modulus and resistance to the fluids being transmitted in the internal passageway of the hose. The coil insert spring may alternatively be formed of annular turns (rings), which are non-self-attached, as will be described in more detail with respect to FIG. 7.

Figure 10:
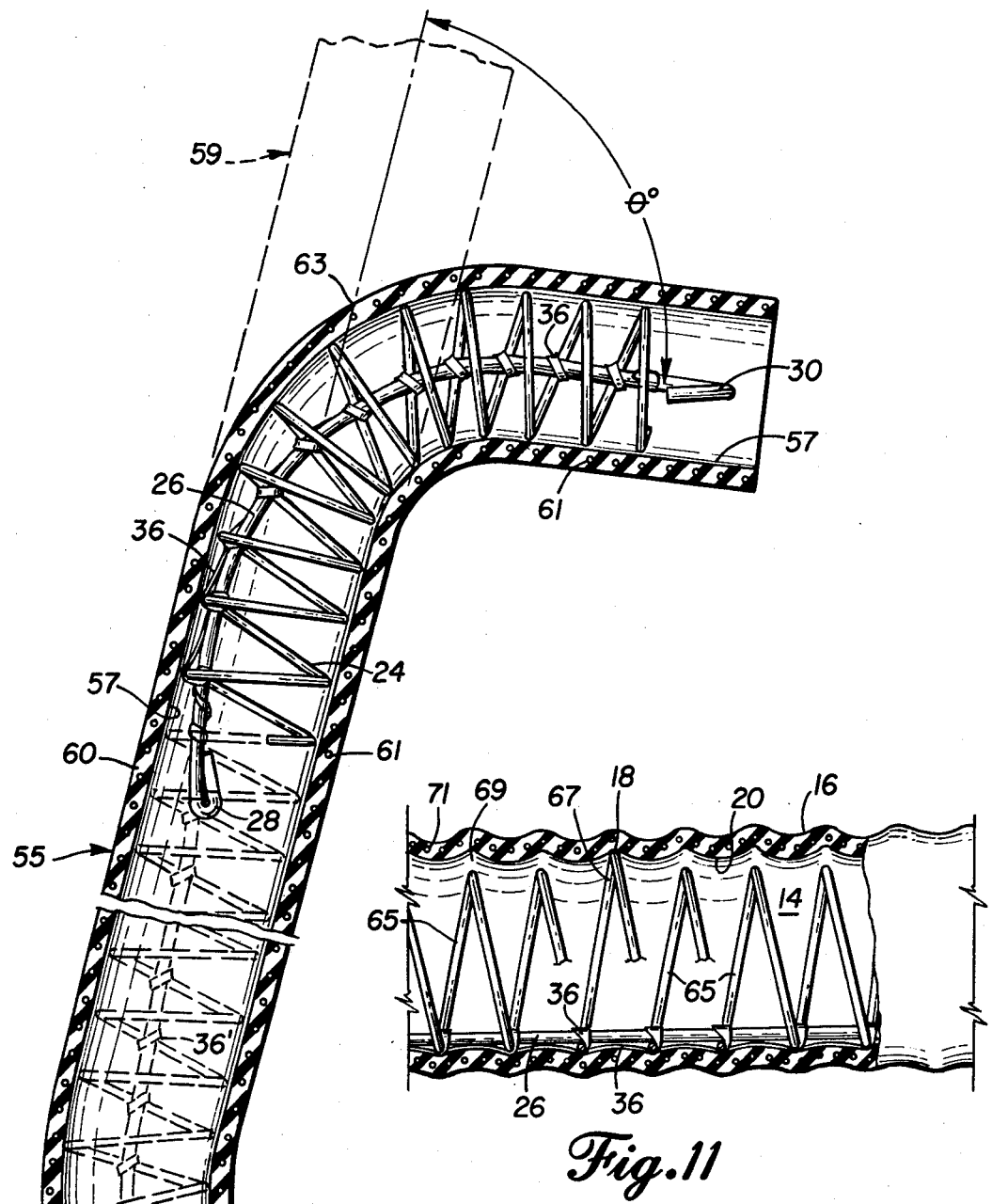
FIG. 10 is an axial sectional view, partly in phantom, of an alternative formable hose of the invention which has been deformed to a desired curvature.

Adjacent the coil insert 22, and preferably interiorly thereof, is positioned a shaping member such as deformable rod means 26 which may be formed of a malleable aluminum, copper or galvanized wire, for instance, adapted to be deformed beyond its yield point after insertion in the hose, to achieve a desired shape-retaining configuration for the hose as illustrated in FIGS. 4 and 10. The rod should have sufficient cross section and modulus so that upon deformation within the hose, the forces tending to cause the hose to rebound to its originally molded (e.g., straightened) form are insufficient to overcome the bias of the newly bent position of the rod 26. The rod ends may terminate in loops 28, 30 which facilitate installation of the cuffed ends 32, 34 onto appropriate fittings, as they provide a ramp surface at the loop portion of the rod.

In accordance with the invention, the shaping member, e.g., rod means, is attached securely to the helical coil insert 22, substantially precluding axial displacement of the rod relative to the helical coil and maintaining accurate pitch spacing between turns 24 (also prevents crossed turns). In the preferred attaching means shown in FIGS. 1-4, and 10-12, a tie band 36 of textile cord or wire, for instance, serves as a continuous wrapping band which alternately fastens spaced turns 24 of the helical coil to the rod 26 at mutually spaced juncture points. In the preferred embodiment shown, the band fastens the rod and convolutions of the coil by spaced half-hitch loops about each juncture of the turns of the coil where they make contact along the length of the rod. As can be seen, the half-hitch loops may be made simply by taking a spool 38 of the band material and orbitally looping it around juncture points of the rod and spring, in a sense opposite to that of the coil spring, and continuing to perform such oribital motions about the rod as an axis until all of the desired juncture points have been looped. This operation may be automated to simplify the attachment procedure. At each of the ends the band material 36 may be pinched within loops 28 and 30 for securing the same. Although the half-hitch attachment has been shown at each juncture of the respective turns 24 with the rod, clearly fewer than all juncture points may be tied down.

Figure 1:
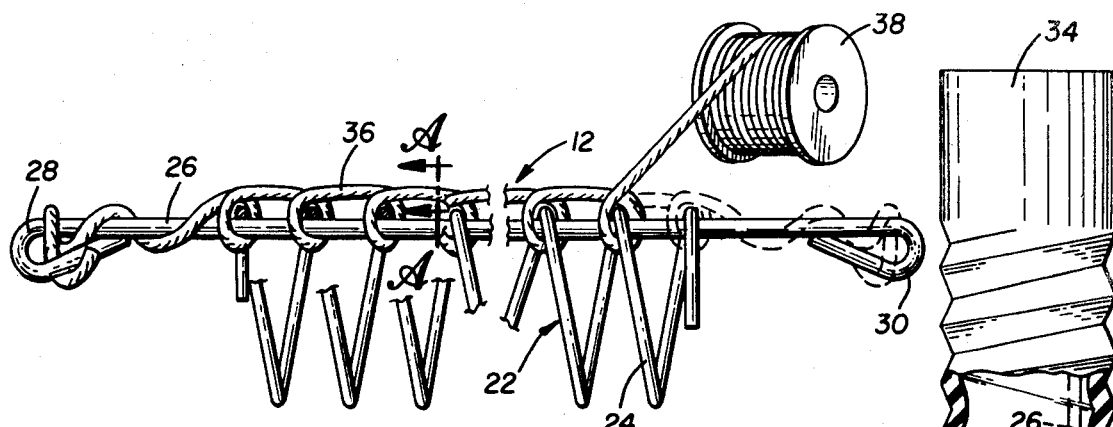
FIG. 1 depicts a preferred composite spring and rod insert of the invention, also showing the manner in which the rod and spring are attached in mutually supportive relation.

Alternative to the substantially round cross-sectioned band 36 depicted in FIG. 1, a tape 25 of plastic or the like may be employed, sandwiching an embedded wire 37, as shown in FIG. 2. Alternatively, as shown in FIG. 3, a thin wire band 39 of aluminum or other material may also suitably serve the intended function of band 36.

An important advantage offered by the composite insert of FIG. 1 is the ability of the turns 24 of the coil to undergo limited lateral, rotative movement (slippage) relative to the rod. The ease or difficulty of slippage can be controlled by choice of materials and winding tension of the applied band. The embodiments of FIGS. 4 and 10 illustrate how, in a compound bend, the rod is able to undergo movement along the coil turns, i.e., laterally or rotationally, to achieve an equilibrium three dimensional serpentine position of limited stress conforming closely to the inner surface of the hose, including its bends.

Figure 6:
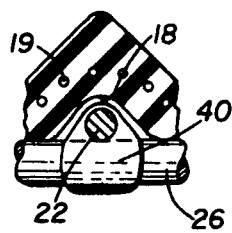
FIG. 6 is an enlarged view along 6—6 of FIG. 5.
Figure 7:
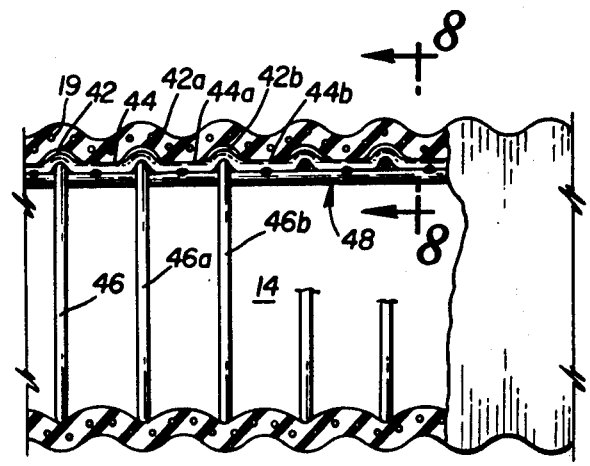
FIG. 7 shows still a further embodiment, depicted similarly to the alternative shown in FIG. 5.

Referring now to FIGS. 5 and 6, an alternative composite insert is shown in which rod 26 is attached to coil 22 with a hot melt 40 of polymeric material at spaced juncture points between the rod and turns of the spring. As can be seen in FIG. 6, the portion of the spring immediately adjacent the juncture with rod 26 may not make contact at the base of trough 18 of the hose. However, the opposite end of the helical convolution of the wire, shown at 43, will make contact with the hose in the trough portions, preferably at the base thereof, and this precludes unseating of the spring during use. The hose of FIGS. 5 and 6 has also been provided with reinforcement 19, such as a wrap of square woven fabric, braid, knit or other reinforcement embedded in the wall of the hose. In this embodiment the hot melt junction unifies the coil spring with the rod as an integral assembly.

Figure 8:
FIG. 8 is a sectional view along line 8—8 of FIG. 7.

In the embodiment of FIGS. 7 and 8, the hose body has an interior wall which has annular, spaced corrugations defined by annular troughs 42, 42a, 42b, etc., spaced apart by annular crests 44, 44a, 44b, etc. The composite insert member is formed of a plurality of annular coils (rings) 46, 46a, 46b respectively positioned within troughs 42, 42a and 42b. The coils 46, 46a, 46b, etc., of the annular reinforcement are held together in properly spaced relationship by a rod means 48 comprised of an inner half rod portion 50, and outer rod half 52 which, together, sandwich the turns of the annular coiled reinforcement as shown in FIG. 7. The rod halves are joined together in any suitable manner, such as by spot welding at a plurality of points intermediate the junctures with the annular coils as shown. Depending upon the dimensions chosen, some lateral slip between the annular rings and the split rod may take place.

In each embodiment, the composite insert may simply be inserted into the hose by thrusting in from one end until the coil turns register with their associated troughs.

Figure 9:
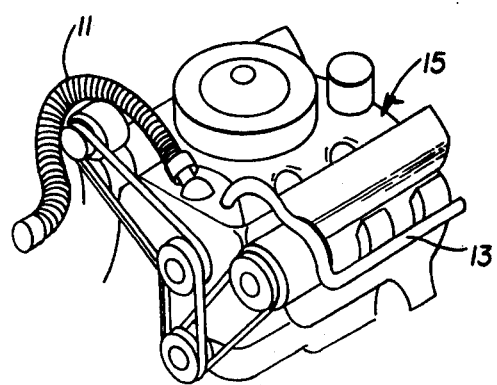
FIG. 9 depicts an automotive engine equipped with deformed hose of the invention.

An automotive radiator coolant hose 11 deformed to a desired shape-retaining configuration in accordance with the invention, is shown installed to the block of an engine 15 in FIG. 9, it being understood that the other end of the hose is to be mounted to the radiator for circulation of coolant. As seen, the hose is deformed so as to provide clearance between V-belts and other engine components and accessories. Heater hose 13 may also have an inserted spring and rod composite, deformed in accordance with the invention.

A detailed view of a normally straight walled (smooth bore) hose, such as an automotive heater hose, configured in accordance with the invention, is shown generally at 55 in FIG. 10. The hose includes a tubular polymeric body 60 with an intermediately positioned, preferably embedded reinforcement 61, defining a smooth, normally straight walled internal bore 57.

The composite insert of FIGS. 1-4 may be inserted in the passageway of the smooth bore hose at any desired intermediate location at which a bend 63 is to be made. Initially, the hose may be straight as shown at 59, and then the hose may be deformed at the specified location through an angle $\phi$ generally up to about 140°, although this angle may be exceeded as dictated by the materials employed, and the shape of the bend. Alternatively the composite insert may extend throughout the longitudinal extent of the hose. Accordingly, helical coil defined by convolutions 24', attached to rod 26' at juncture points by band 36', extends through the hose passageway including bend portion 63', to the opposite end termination 28'.

The coil convolutions 24, 24' fit tightly against wall 57 at bends 63, 63', and clearance may be provided elsewhere, as shown. By virtue of the bend portion(s) in the rod 26, particularly if the bend angle is acute (e.g., exceeding about 60°), and/or a tight fit exists at the bends, the composite insert will not tend to migrate or displace in use even under elevated fluid pressure and turbulence.

Figure 11:
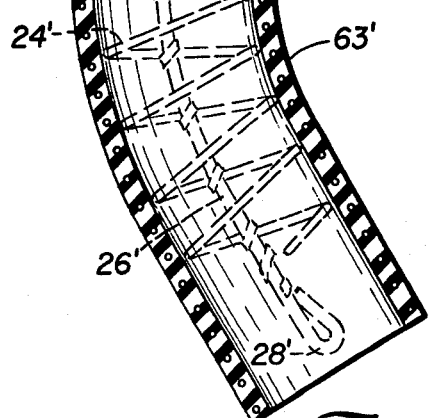
FIG. 11 depicts in partial axial section a further alternative hose construction of the invention.
Figure 12:
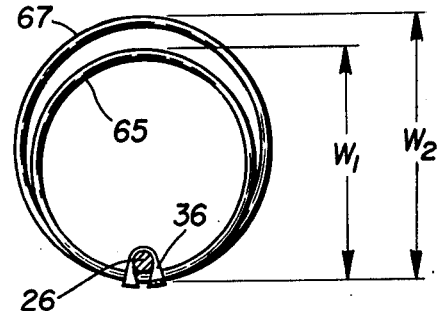
FIG. 12 illustrates a portion of the composite coiled insert shown in FIG. 11.

If, however, because of low angle bends, and/or radial expansion of the hose during use, there is the possibility that the composite insert may migrate and even be expelled from the hose passageway, it is preferred to employ the insert of FIG. 12. This insert may be employed in a smooth bore hose (not shown), in an internally corrugated hose as shown in FIG. 11, or other configuration. This insert is characterized by a helical (or annular) coil having turns 65 of a given cross dimension $W_1$, and at least one turn 67 of relatively greater cross dimension $W_2$. By way of example the turns are attached to deformable rod 26 at a plurality of juncture points with the aid of band 36, as in the previous embodiments.

As seen in FIG. 11, the oversized coil 67 makes substantially direct contact with troughs 18 (preferably at the base thereof) formed at the internal corrugated wall of the hose, while coils 65 may be spaced from the wall, as at 69. The hose generally includes a tubular polymeric body 16 in which is contained a reinforcement 71. Thus, even if the hose expands in use, coil 67 will be sized greater than the corresponding distance between juxtaposed crests 20 to preclude dislodgement. And because only a single or relatively small proportion of the turns of the coil are made oversized, initial insertion into the hose is made possible without damage to the hose or permanent deformation of the coil. Preferably, the differential between $W_1$, and $W_2$ is from about 1/16 to about 5/16, more preferably from about ⅛ to about 3/16 inches.

While certain representative embodiments and details have been shown for the purposes of illustrating the invention, it will be apparent to those skilled in this art that various changes and modifications may be made therein without departing from the spirit or scope of the invention.

What is claimed is:

1. A hose adapted to be selectively deformed to a desired configuration, comprising:
    an elongated flexible polymeric hose body having an internal passageway;
    a helical coil spring insert reinforcement positioned within the passageway thereof and having portions positioned adjacent the hose body;
    shaping member means positioned adjacent said portions of the spring means and selectively deformable to a desired shape-retaining configuration; and
    means distinct from the shaping member means and spring means attaching the shaping member means to said portions of the spring means.

2. The hose of claim 1 wherein the hose body has a corrugated inner wall defined by troughs and crests, at least a portion of the spring insert means being positioned in said troughs.

3. The hose of claim 2 wherein the inner wall is corrugated in spiral convoluted form, and the helical coil spring insert is provided with turns positioned in the troughs adjacent the hose body and at least a portion of which makes substantially direct surface contact with the troughs.

4. The hose of claim 3 wherein at least one turn of the helical coil is oversized relative to the remaining turns, the oversized turn(s) making said direct surface contact with said trough(s).

5. The hose of claim 1 wherein the hose body has a substantially smooth bore inner wall.

6. The hose of claim 5 wherein the spring insert and/or shaping member extends lengthwise along only a portion of the internal passageway of the hose.

7. The hose of claim 6 wherein the hose is adapted to be deformed to the desired configuration through an angle of at least about 140°.

8. The hose of claim 1 wherein the shaping member means is a rod of malleable material extending axially within the hose.

9. The hose of claim 3 wherein the attaching means is a continuous wrapping band alternately fastening spaced turns of the helical coil to the rod means at mutual juncture points therealong.

10. The hose of claim 1 whose coil insert reinforcement has turns of a first cross dimension, and at least one turn of a second cross dimension of relatively greater dimension than said first cross dimension.

11. A hose adapted to be selectively deformed to a desired configuration comprising: an elongated normally straight polymeric hose body adapted to be flexed to said desired configuration; a helical coil spring insert reinforcement formed of spaced turns positioned in the passageway and adjacent the polymeric hose body; rod means positioned adjacent the spring means and selectively deformable to a desired shape-retaining configuration; and means distinct from the spring means and rod means attaching the rod means to the spring means in mutually supportive relation.

12. The hose of claim 11 wherein the hose is substantially straight walled.

13. The hose of claim 11 wherein the attaching means is a continuous wrapping band alternately fastening spaced turns of the spring insert reinforcement means at mutually spaced juncture points, adapted and arranged so that the turns may undergo limited lateral movement relative to the rod means.

14. A hose adapted to be selectively deformed to a desired configuration, comprising:
    an elongated normally straight polymeric hose body including a corrugated inner wall defined by troughs and crests;

a helical coil spring insert reinforcement positioned in the troughs, adjacent the hose body and within the passageway thereof;

rod means positioned adjacent the spring means and having a sufficient cross section and modulus to be selectively deformable to a desired shape retaining configuration within the hose; and means distinct from the spring means and rod means attaching the rod means to the spring means in mutually supportive relation.

15. The hose of claim 14 wherein the inner wall is corrugated in spiral convoluted form, and the spring insert has turns fitting in the troughs of the spiral convolution.

16. The hose of claim 14 wherein the rod means is positioned interiorly of the spring insert means.

17. The hose of claim 15 wherein the attaching means is a continuous wrapping band alternately fastening spaced turns of the helical coil to the rod means at mutual juncture points therealong.

18. A collapse resistant molded hose adapted to be selectively deformed to a desired curved shape, comprising:

an elongated normally straight molded polymeric hose body including a spirally convoluted inner wall defined by alternating troughs and crests;

helical coil insert means having turns positioned in the troughs adjacent the hose body and at least a portion of which makes direct surface contact with the troughs;

yieldable rod means positioned interiorly adjacent the helical coil insert means extending axially within the hose, and deformable to a desired shape retaining configuration; and means distinct from the helical coil insert means and rod means attaching the rod means to the helical coil insert means at turns thereof in mutually supportive relation.

19. The hose of claim 18 wherein the attaching means is a continuous wrapping band alternately fastening spaced turns of the helical coil to the rod means at mutually spaced juncture points, adapted and arranged so that the turns may undergo limited lateral, rotative movement relative to the rod means.

20. The hose of claim 19 wherein the attaching means substantially precludes axial movement of the rod means relative to the helical coil during normal usage of the hose.

21. The hose of claim 18 wherein the attaching means is a polymeric melt joining turns of the helical coil to the rods means at spaced points therealong.

22. The hose of claim 18 wherein the attaching means is an elongated rod member positioned exteriorly of the helical coil and securely fastened to the rod means at spaced points therealong, thereby tightly sandwiching turns of the helical coil between the exterior rod member and interior rod means.

23. The hose of claim 18 wherein the attaching means is a continuous wrapping band alternately fastening consecutive turns of the helical coil to the rod means at juncture points of the turns of the helical coil and the rod means.

24. A collapse resistant molded corrugated elastomeric hose adapted to be bent to a desired curved shape, comprising:

an elastomeric body having an embedded textile reinforcement, and a corrugated inner wall formed of alternate troughs and crests;

a non-embedded helical coil insert having turns positioned in the troughs, at least a portion of which makes direct surface contact with the bottom of the troughs;

an axially extending generally circular cross-sectioned yieldable rod positioned immediately adjacent the coil insert along its inner surface and deformable to a desired shape retaining configuration; and means distinct from the rod and the helical coil attaching the rod to the coil insert in mutually supportive relation at discrete points therealong.

25. The hose of claim 24 wherein the attaching means is a continuous band alternately wrapping in half-hitch configuration spaced turns of the coil and the rod at mutual juncture points therealong.

26. In a collapse resistant formable hose kit comprising a polymeric flexible hose body having an internal passageway, and a composite coiled insert member adapted to be inserted in the passageway of the hose and retained in place, an improved composite insert member comprising:

a helical coil spring reinforcement having a plurality of coils spaced apart;

rod means positioned adjacent the spring reinforcement and selectively deformable to a desired shape-retaining configuration; and means distinct from the helical coil reinforcement rod means attaching the rod means to the spring reinforcement in mutually supportive relation.

27. The insert of claim 26 wherein the flexible hose body has a corrugated inner wall defined by troughs and crests, and coils of the spring reinforcement are adapted to correspond and register in corresponding troughs of the inner wall to secure the same therein.

* * * * *